US011473934B2

United States Patent
Anderson

(10) Patent No.: US 11,473,934 B2
(45) Date of Patent: Oct. 18, 2022

(54) ALARM ARBITRATION IN METERING POINTS

(71) Applicant: Schneider Electric USA, Inc., Boston, MA (US)

(72) Inventor: David P. Anderson, Victoria (CA)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 16/952,883

(22) Filed: Nov. 19, 2020

(65) Prior Publication Data

US 2022/0155100 A1    May 19, 2022

(51) Int. Cl.
*G01D 4/00* (2006.01)
*H04Q 9/00* (2006.01)

(52) U.S. Cl.
CPC .............. *G01D 4/004* (2013.01); *H04Q 9/00* (2013.01); *H04Q 2209/60* (2013.01)

(58) Field of Classification Search
CPC ....... G01D 4/004; H04Q 9/00; H04Q 2209/60
See application file for complete search history.

(56) References Cited

U.S. PATENT DOCUMENTS

| 2006/0238339 | A1* | 10/2006 | Primm | G08B 13/19656 340/540 |
| 2009/0066528 | A1* | 3/2009 | Bickel | G01R 19/2513 340/657 |
| 2009/0204368 | A1* | 8/2009 | Bickel | G01D 4/002 702/179 |
| 2016/0063845 | A1* | 3/2016 | Lloyd | G05B 23/027 340/679 |

FOREIGN PATENT DOCUMENTS

WO    2019195532 A    10/2019

OTHER PUBLICATIONS

EP Extended Search Report for EP Application No. 21207970.1 dated May 3, 2022.

\* cited by examiner

*Primary Examiner* — Amine Benlagsir
(74) *Attorney, Agent, or Firm* — Locke Lord LLP

(57) ABSTRACT

Systems and methods for managing alarms in an electrical power system employ intelligent electronic devices (IEDs) equipped with alarm arbitration capability. This capability allows an IED to aggregate alarms from multiple other IEDs relating to the same event or overlapping alarm events and provide one report about the event to a monitor and control system. In some embodiments, the alarm arbitration is performed based on IED power levels, that the IED having the highest power level is designated as the owner of the alarm event for alarm reporting purposes. Such an arrangement allows one IED to send a single report to the monitor and control system instead of potentially dozens of individual reports being sent by potentially dozens of IEDs for the same event or overlapping alarm events.

20 Claims, 10 Drawing Sheets

ALARM ARBITRATION IN METERING POINTS

TECHNICAL FIELD

Embodiments of the present disclosure relate generally to intelligent electronic devices and, more particularly, to systems and methods for managing alarm events that are shared by multiple intelligent electronic devices.

BACKGROUND

An intelligent electronic device (IED) is a microprocessor-based device that can be used to monitor and control a variety of systems and equipment. IEDs are employed in applications ranging from manufacturing plants, to assembly lines, to chemical refineries, to electrical power systems. In electrical power systems, IEDs are often installed at metering points or nodes, such as a circuit breaker, transformer, fuse, or switch, to provide power quality monitoring, power metering, and to control the node. The IED can trip the circuit breaker, for example, and can also send an alarm to a monitor and control system when it detects an alarm event, such as a voltage sag, current spike, or change in power capacity.

When an alarm event occurs in an electrical power system, multiple IEDs often detect the event, including the IED installed at the node where the event occurred, as well as IEDs installed at neighboring nodes. Each IED reports a separate alarm to the monitor and control system, resulting in numerous alarms being received and logged at the monitor and control system for the same alarm event. A user must then go through the alarm log and separately acknowledge multiple individual alarms for the same alarm event. This process can be tedious and time-consuming for the user, especially in a system with potentially dozens of metering points.

Thus, while a number of advances have been made in the field of intelligent electronic devices, it will be readily appreciated that improvements are continually needed.

SUMMARY

The present disclosure generally relates to systems and methods for managing alarms in an electrical system, such as an electrical power system. The systems and methods use IEDs installed or located at respective metering points or nodes in the electrical system to detect alarm events in the system. Each IED is equipped to detect alarm events and communicate information relating to the alarm events to other IEDs. The information may include, for example, the identification of the detecting IED, the operating power level of the IED, and the timestamp of the alarm event. When an event communication is received by an IED, the receiving IED determines whether the information in the communication corresponds to any alarm event detected recently by the receiving IED. For example, the receiving IED may compare the timestamp in the communication to the timestamp for any alarm event recently detected by the IED. If the timestamps match (within a certain percent tolerance), then this indicates occurrence of a shared event or overlapping events. The receiving IED then determines whether it should take ownership of the shared alarm event, or whether the IED that sent the communication should take ownership of the alarm event for reporting purposes. In some embodiments, the ownership determination may be performed using an arbitration process based on whether the receiving IED or the sending IED has a higher operating power level. The receiving IED then communicates the results of the arbitration to other IEDs.

This above process continues for each IED that detected the alarm event until expiration of a predefined event window. The event window start time for each IED, in some embodiments, is the timestamp in the first communication received from any IED about the alarm event, and should be long enough to allow all (or most) IEDs that subsequently detect the alarm event to complete their arbitrations and communicate the results. Whichever IED has ownership of the alarm event after the event window closes will aggregate the event information from the other IEDs and report the information to a monitor and control system. The report may include the identification of the owner IED, the timestamp of the alarm event, the identifications of the other IEDs that detected the alarm event, and in some embodiments, any parametric data or information that was collected about the alarm event, such as voltage level, current level, power level (real, reactive, and/or apparent), power factor, line frequency, event duration, and the like.

In some embodiments, instead of each IED performing its own arbitration procedure for the alarm event, one IED may be designated as the arbitrator for a group or quorum of IEDs. In these embodiments, the IEDs in the quorum that detected the alarm event communicate information relating to the alarm event to the designated arbitrator IED. The designated arbitrator IED waits until the event window expires to allow all (or most) quorum IEDs to communicate their event information, then determines which IED should take ownership of the alarm event for reporting purposes. In some embodiments, the ownership determination may be performed using an arbitration procedure based on which IED has the highest operating power level. The designated arbitrator IED then sends a communication notifying the IEDs in the quorum of the arbitration result. Whichever IED was arbitrated the owner proceeds to aggregate the event information received from the other IEDs and reports the information to the monitor and control system.

The above methods and systems combine alarms from multiple IEDs relating to a shared alarm event or overlapping events into a single report by one IED to the monitor and control system. This avoids potentially dozens of separate reports from potentially dozens of IEDs being logged by the monitor and control system for the same alarm event or overlapping events. The monitor and control system may thereafter automatically take one or more actions (e.g., store the report, send notifications, raise alerts, adjust system parameters, etc.) as needed based on the information in the report.

In general, in one aspect, the present disclosure relates to an intelligent electronic device (IED). The IED comprises, among other things, a processing system and a storage system coupled to the processing system. The storage system stores instructions thereon that, when executed by the processing system, cause the IED to capture energy-related signals at the IED and detect occurrence of an alarm event based on the energy-related signals. The instructions also cause the processing system to receive a communication from another IED containing information about an alarm event detected by the other IED. The instructions further cause the processing system to confirm whether the alarm event detected by the IED and the alarm event detected by the other IED relate to a shared alarm event or are overlapping alarm events. The instructions still further cause the processing system to perform an arbitration procedure in response to confirmation that the alarm event detected by the IED and the alarm event detected by the other IED relate to a shared alarm event or are overlapping alarm events, the arbitration procedure determining which IED owns the shared alarm event or the overlapping alarm event. The instructions yet further cause the processing system to aggregate information about the shared alarm event or the overlapping alarm events in response to a determination that the IED owns the shared alarm event or the overlapping alarm events, the information including identification information for at least the IED and the other IED. The IED then sends a report containing the aggregated information about the shared alarm event or the overlapping alarm events to a monitor and control system.

In general, in another aspect, the present disclosure relates to a method of managing alarms in an electrical power system. The method comprises, among other things, capturing energy-related signal at a first intelligent electronic device (IED) in the electrical power system and at a second IED in the electrical system, each IED located at a different node in the electrical power system. The method also comprises detecting occurrence of an alarm event at the first IED based on the energy-related signal, and receiving, at the first IED, a communication from the second IED, the communication containing information about an alarm event detected by the second IED. The method further comprises confirming, at the first IED, whether the alarm event detected by the first IED and the alarm event detected by the second IED relate to a shared alarm event or are overlapping alarm events. The method still further comprises performing, at the first IED, an arbitration procedure in response to confirmation that the alarm event detected by the first IED and the alarm event detected by the second IED relate to a shared alarm event or are overlapping alarm events, the arbitration procedure determining which IED owns the shared alarm event or the overlapping alarm event. The method yet further comprises aggregating, at the first IED, information about the shared alarm event or the overlapping alarm events in response to a determination that the first IED owns the shared alarm event or the overlapping alarm events, the information including identification information for at least the first IED and the second IED. The first IED then sends a report containing the aggregated information about the shared alarm event or the overlapping alarm events to a monitor and control system.

In general, in yet another aspect, the present disclosure relates a system for managing alarms in an electrical power system. The system comprises, among other things, a plurality of intelligent electronic devices (IEDs) in the electrical power system, each IED located at a different node in the electrical power system. Each IED stores programming therein that causes the IED to capture energy-related signals at the IED, and detect occurrence of an alarm event based on the energy-related signals. The programming also causes the IED to receive a communication from at least one other IED containing information about an alarm event detected by the at least one at least one other IED, and confirm whether the alarm event detected by the IED and the alarm event detected by the at least one other IED relate to a shared alarm event or are overlapping alarm events. The programming further causes the IED to perform an arbitration procedure in response to confirmation that the alarm event detected by the IED and the alarm event detected by the at least one other IED relate to a shared alarm event or are overlapping alarm events, the arbitration procedure determining which IED owns the shared alarm event or the overlapping alarm event. The programming still further causes the IED to aggregate information about the shared alarm event or the overlapping alarm events in response to a determination that the IED owns the shared alarm event or the overlapping alarm events, the information including identification information for at least the IED and the at least one other IED. The programming yet further causes the IED to send a report containing the aggregated information about the shared alarm event or the overlapping alarm events to a monitor and control system.

In accordance with any one or more of the foregoing embodiments, a comparison is performed from the timestamp of a detected alarm event and the timestamp of a received alarm event to confirm whether the detected alarm event and the received alarm event relate to a shared alarm event or are overlapping alarm events. In accordance with any one or more of the foregoing embodiments, a broadcast communication is sent in response to detecting occurrence of an alarm event, the broadcast communication containing information about the detected alarm.

In accordance with any one or more of the foregoing embodiments, the arbitration procedure is performed based on IED operating power levels. In accordance with any one or more of the foregoing embodiments, the arbitration procedure performed is one of a device-device arbitration procedure and a quorum arbitration procedure, the device-device arbitration procedure arbitrating between two IEDs, and the quorum arbitration procedure arbitrating amongst two or more IEDs.

In accordance with any one or more of the foregoing embodiments, an acknowledgment communication is sent in response to confirming that the detected alarm event and the received alarm event relate to a shared alarm event or are overlapping alarm events, the acknowledgment communication being sent as one of a broadcast communication to all IEDs and a specific communication to an IED designated as an arbitrator. In accordance with any one or more of the foregoing embodiments, a communication is sent confirming an IED owns the shared alarm event or the overlapping alarm events in response to a determination that the IED owns the shared alarm event or the overlapping alarm events, the communication being sent as one of a broadcast communication to all IEDs and a specific communication to the second IED.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural references unless expressly and unequivocally limited to one reference. As used herein, the term "includes" and its grammatical variants are intended to be non-limiting, such that recitation of items in a list is not to the exclusion of other like items that can be substituted or added to the listed items.

Figure 1:
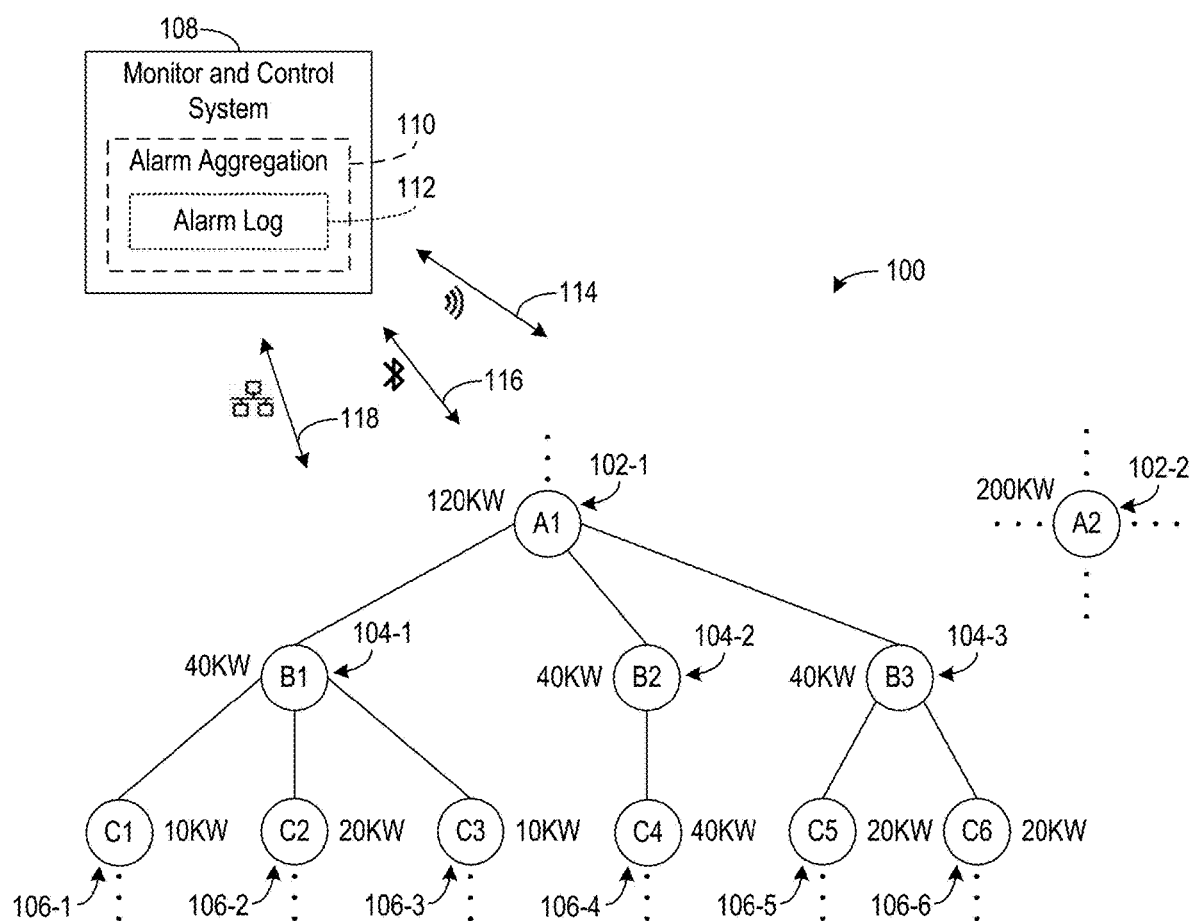
FIG. 1 is a block diagram illustrating a portion of an exemplary power distribution system according to embodiments of the present disclosure.

Referring now to FIG. 1, a portion of an exemplary electrical power system 100 is shown in accordance with embodiments of the disclosure. The electrical power system 100 may be any network of electrical components that are used in the supply, transmission, and/or consumption of electric power. Such an electrical power system 100 may be deployed, for example, in a manufacturing plant, assembly line, chemical refinery, and the like.

As can be seen, the electrical power system 100 has a plurality of IEDs, labeled as A1 to A2, B1 to B3, and C1 to C6, each of which is time synchronized to the other IEDs and uniquely identifiable from the other IEDs by an identification number, or code, and the like. Each IED is installed or otherwise located at a respective node in the system 100, labeled as 102-1 to 102-2, 104-1 to 104-3, and 106-1 to 106-6. The solid lines connecting the various nodes represent electrical conductors (e.g., wires, cables, etc.) that carry power between the various nodes. The nodes are arranged hierarchically in this example, with nodes labeled as 102 being higher in the hierarchy than nodes labeled as 104, which are in turn higher in the hierarchy than nodes labeled as 106, and so forth. This mean IEDs A1, A2 generally operate at a higher power level than IEDs B1, B2, B3, which in turn generally operate at a higher power level than IEDs C1, C2, C3, C4, C5, C6. Preferably, the operating power level for an IED at a given node equals the operating power levels of the IEDs at nodes one hierarchy level downstream from the given node that are fed by the given node. Thus, the operating power level for A1 equals the operating power levels for B1, B2, B3, while the operating power level for B1 equals the operating power levels for C1, C2, C3, and so on. Note that the operating power level for B2 and C4 are the same in this example.

The IEDs may be any device incorporating one or more microprocessors with the capability to receive and send data and control commands from and to an external system or device. Examples of suitable IEDs include the PowerLogic ION9000 power quality meter and the PowerLogic PM8000 multifunction power meter, both available from Schneider Electric USA, Inc. These IEDs typically generate several types of alarms, including setpoint (standard) alarms, disturbance alarms, unary alarms and the like. Setpoint alarms compare the actual value of a measured parameter (e.g., voltage, current, power, etc.) to a specified limit or range of values, disturbance alarms are triggered on a measured current or voltage sag or swell, and unary alarms are based on the IED's operational state, for example, when the IED is powering up. The IEDs can communicate with an external system or device through several different wired and wireless communication protocols, including real-time Ethernet, Fieldbus, Wi-Fi, Bluetooth, ZigBee, and the like.

A monitor and control system 108 receives the communications from the IEDs for monitoring and control purposes. In particular, the monitor and control system 108 has an alarm aggregation module 110 that operates to receive alarms from the IEDs and store them in an alarm log 112. The alarms may be received over any of the above mentioned wired or wireless communication link, such as a Wi-Fi link 114, a Bluetooth link 116, and an Ethernet link 118. Users may then review the alarm log 112 and resolve any alarms therein or take other actions as needed. The monitor and control system 108 may also automatically initiate actions as warranted to resolve an alarm, including sounding an alert, adjusting a system parameter, and sending an alarm notification. Such a monitoring control system 108 may be a SCADA (Supervisory Control and Data Acquisition) system, a DCS (distributed control system), or any other type of system that can be used to monitor and control an electrical power system like the system 100.

In accordance with embodiments of the present disclosure, one or more of the IEDs in the electrical power system 100 is equipped with alarm arbitration capability. The alarm arbitration capability allows the IEDs to determine which IED from among multiple IEDs is the owner of an alarm event for reporting purposes. The IED that is arbitrated the owner then aggregates alarm information from the other IEDs that detected the alarm event and sends a report about the alarm event to the monitor and control system 108. In some embodiments, arbitration may be based on the operating power levels of the IEDs, such that the IED with the higher operating power level is designated as the owner of the alarm event for alarm reporting purposes. In other embodiments, alternative arbitration criteria may be used, such as the location of the IED within the electrical power system 100, with alarm ownership conferred to IEDs that are higher upstream in the hierarchy over IEDs that are lower downstream. Other arbitration criteria known to those skilled in the art may also be used within the scope of the disclosed embodiments.

The above process avoids having potentially dozens of separate reports sent to the monitor and control system 108 by potentially dozens of IEDs for the same (i.e., shared) alarm event or a related (i.e., overlapping) alarm event. Moreover, the alarm arbitration capability allows an IED to be installed at any node in the electrical system 100 without requiring specific setting or configuration for alarm reporting purposes. Once it is plugged into the electrical power system 100, the IED can simply use its alarm arbitration capability to determine whether it needs to report an alarm event to the monitor and control system 108.

Figure 2:
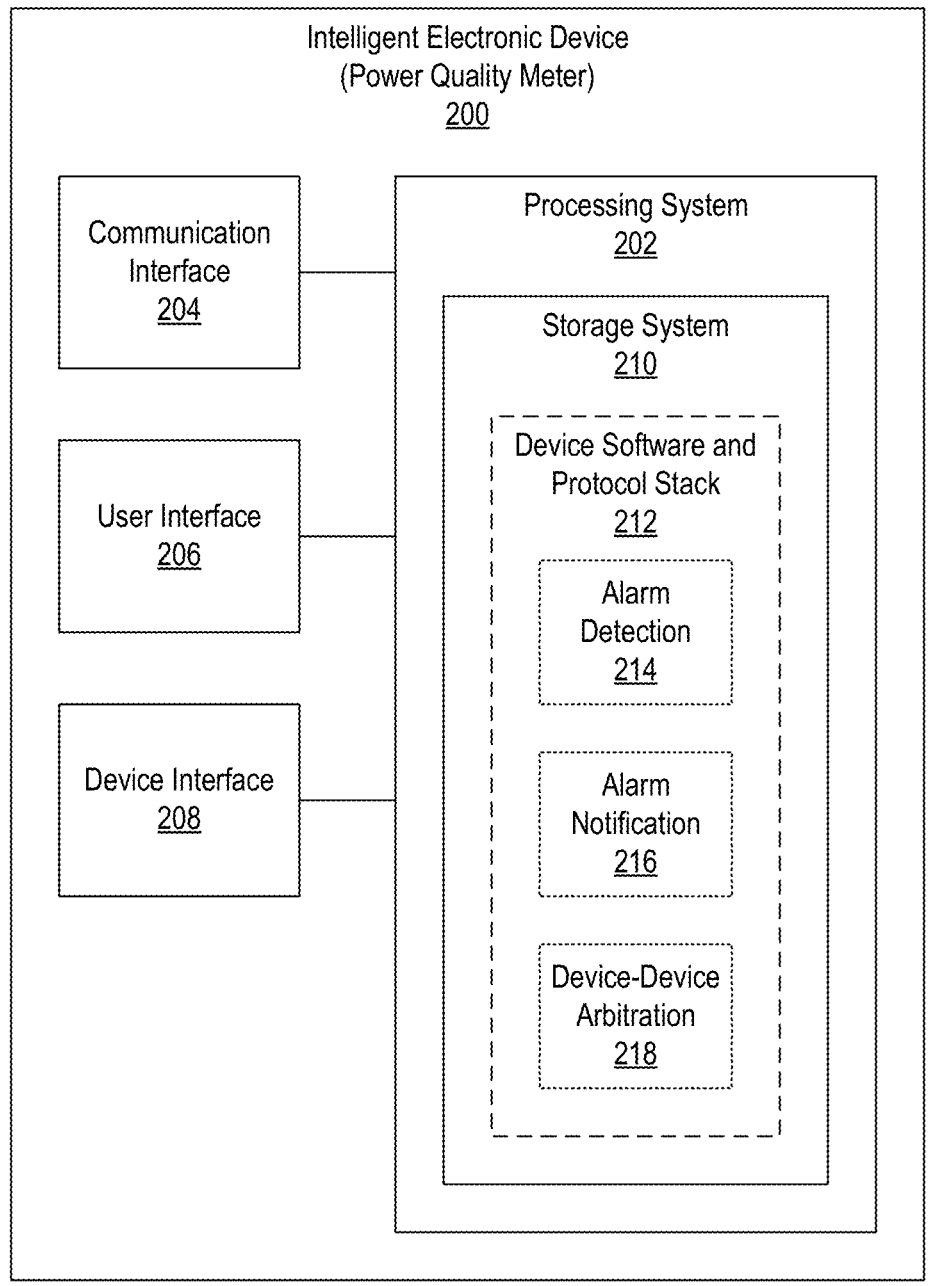
FIG. 2 is a block diagram illustrating exemplary intelligent electronic device according to embodiments of the present disclosure.

FIG. 2 illustrates a simplified view of an exemplary IED 200 that may be used to implement one or more aspects of the alarm arbitration embodiments of the present disclosure. The IED 200 includes a processing system 202, communication interface 204, user interface 206, and device interface 208, all connected to the processing system 202. Operation of these components is well known in the art and therefore only a brief description is provided for economy. The communication interface 204, which may be a wired or wireless communication interface, permits the EID 200 to communicate with other systems or devices. The user interface 204, which may be an HMI or other display with user input keys or buttons, enables user configuration and control of the IED 200. The device interface 208, which may be one or more input/output ports, allows the IED 200 to connect and receive power metering signals, including voltage signals, current signals, power signals, and other energy-related signals, at a node in the electrical power system.

The processing system 202 includes a storage system 210, which can be a disk drive, flash drive, memory circuitry, or other memory device. The storage system 210 can store software 212, such as device software and protocol stack, for the IED 200 that is used in the operation of the IED 200. The software 210 can also include computer programs, firmware, or other forms of machine-readable instructions, including an operating system, utilities, drivers, network interfaces, applications, and other types of software. Although not expressly shown, the processing system 202 can also include at least one microprocessor and other circuitry to retrieve and execute the software 212 from storage system 210.

In accordance with embodiments of the present disclosure, the software 212 has an alarm detection module 214, an alarm notification module 216, and a device-device arbitration module 218 stored thereon, among other programming. The alarm detection module 214 operates to detect electrical power anomalies for the IED 200 at the node where the IED is installed or located. In general, the IED 200 is configured for operation at a certain power level based on the expected electrical power conducted through the node where the IED 200 is installed. If the power level at that node deviates from the expected power level by more than a predefined tolerance (e.g., ±10 percent), even if only briefly, then the alarm detection module 214 detects the deviation and raises an alarm in the IED 200. Events that may cause an alarm to be raised include voltage/current transients, interruptions, sags or undervoltages, and swells or overvoltages, as well as waveform distortions, voltage fluctuations, and frequency variations anomalies, and other electrical anomalies that cause the power level at the node to vary by more than the percent tolerance.

When an alarm event occurs, the alarm detection module 214 records certain information about the event. The information recorded may include the timestamp when the event occurred, the type of event (e.g., voltage/current transient, interruption, sag or undervoltage, swell or overvoltage, etc.), the event duration, and other information that may be relevant to a user for resolving the alarm. This information is then provided to the alarm notification module 216, which packages (i.e., formats) the information together with the identification of the IED 200 and the power level of the IED. The alarm notification module 216 then forwards the package of information for the alarm event to the communication interface 204 to be communicated to other IEDs. As mentioned earlier, the communication interface 204 can transmit the information over any wired and/or wireless communication link known to those skilled in the art.

Other IEDs similar to the IED 200 that also detected the alarm event can likewise communicate the information they recorded about the alarm event. For each such communication that the IED 200 receives from the other IEDs, the device-device arbitration module 218 stores the information contained in the communication and confirms whether the communication relates to any alarm event recently detected by the IED 200. In some embodiments, the device-device arbitration module 218 confirms an alarm event by comparing the timestamp for the alarm event in the communication to the timestamp of any alarm event recently detected by the IED 200. If there is no match within a certain percent tolerance, then the alarm events are not related and the IED 200 need not take further action for purposes of reporting the event. If the timestamps match within a certain percent tolerance, then the alarm event in the communication and the alarm event recently detected by the IED 200 are the same (i.e., shared) event, or events that relate to each other (i.e., overlap).

If a shared or an overlapping alarm event is confirmed, then the device-device arbitration module 218 conducts an arbitration procedure to determine which IED should be the owner of the alarm event. In some embodiments, the device-device arbitration module 218 conducts the arbitration procedure based on the operating power levels of the IEDs, such that the IED with the higher operating power level is determined to be the owner of the alarm event for alarm reporting purposes. The device-device arbitration module 218 then packages (i.e., formats) the result of the arbitration, including the identification of the arbitrated owner, together with an acknowledgment, the identification of the IED 200, and the operating power level of the IED 200, for transmission. The device-device arbitration module 218 thereafter forwards this package of information to the communication interface 204 to be communicated to other IEDs in the manner described above. At this point, if the IED 200 itself was arbitrated the owner, then it remains in the process for alarm reporting purposes. Otherwise, if the IED 200 was not arbitrated the owner, then it is no longer needed and can drop out of the process or take no further action for reporting purposes.

The above process proceeds for each IED that received a communication about an alarm event within a predefined window for the event. If an IED has ownership of the alarm event after the event window closes, then it reports the event to the monitor and control system 108. If the IED is supplanted by another IED as owner of the alarm event during the event window, then it takes no further reporting action and drops out of the reporting process, and whichever IED has ownership when the event window closes will send the report. As mentioned, the report may include the timestamp of the alarm event, the identifications of all (or most) IEDs that detected the alarm event (as contained in their communications), and any parametric data or information the owner IED collected about the alarm event, such as voltage level, current level, power level (real, reactive, and/or apparent), power factor, line frequency, event duration, and the like.

In some embodiments, the event window start time for each IED is the event timestamp in the first communication received from any IED about the alarm event. This start time is then used as the event window start time by each IED that received the communication. The event window lasts a sufficient time period to allow all (or most) IEDs that detected a shared or overlapping alarm event to complete their arbitrations and transmit the results. The window should be short enough, however, to provide real-time or near real-time alarm reporting to the monitor and control system 108. In some embodiments, the event window may be 1-2 seconds, depending on IED detection response times and processing speeds.

Figure 3:
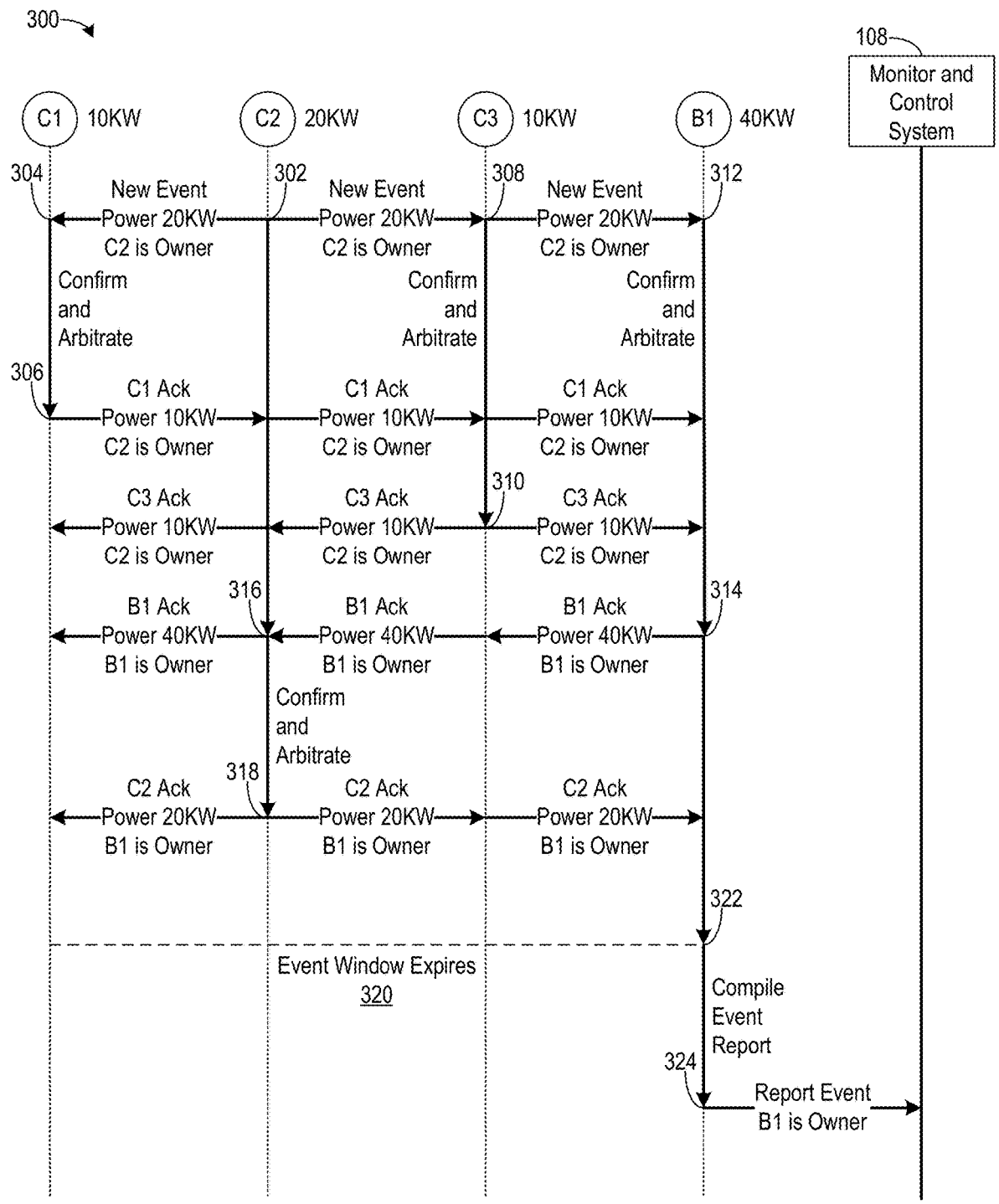
FIG. 3 is a timing diagram illustrating an exemplary alarm arbitration sequence according to embodiments of the present disclosure.

FIG. 3 illustrates an exemplary timing diagram 300 showing a sequence similar to the one described above for IEDs B1, C1, C2, C3 from FIG. 1. In this example, C2 has detected an alarm event and sends a communication about the event to other IEDs at 302, including the C2 timestamp for the event. This timestamp becomes the start time for an event window in C2 (and in other IEDs that received the communication). The communication transmitted by C2 is a general broadcast communication to all IEDs in this example. C1 receives the broadcast at 304, confirms that it detected the same alarm event (e.g., via comparison of timestamps), and initiates an arbitration procedure. The arbitration procedure determines that C2 is the owner of the alarm event because C2 has a higher operating power level (20 KW) compared to C1 (10 KW). C1 then sends a broadcast at 306 that includes an acknowledgment, the C1 power level, and the result of the arbitration identifying C2 as the owner of the event. C1 is thereafter no longer involved in this alarm event for reporting purposes. Likewise, C3 receives the broadcast from C2 at 308, confirms the alarm event, and determines that C2 is the owner based on its higher power level. C3 then sends a broadcast at 310 with an acknowledgment, the C3 power level, and identifies C2 as the event owner. C3 is thereafter no longer involved in this alarm event for reporting purposes.

B1 also receives the broadcast from C2 at 312, confirms the alarm event, and initiates an arbitration procedure. The arbitration procedure determines that B1, not C2, is the owner of the alarm event because B1 has a higher power level (40 KW) compared to C2 (20 KW). B1 then sends a broadcast at 312 with an acknowledgment, the B1 power level, and identifies itself as the event owner. C1, C2, C3 receive the broadcast from B1, but C1 and C3 have already dropped out and can thus ignore the broadcast. C2 still has itself designated as the owner of the alarm event at this time, and is thus still involved in the alarm event for reporting purposes. Upon receiving the broadcast from B1 at 316, C2 initiates its arbitration procedure, which changes the owner designation to B1 because B1 has a higher power level. C2 then sends a broadcast at 318 with an acknowledgment, the C2 power level, and identifies B1 as the event owner. C2 is thereafter no longer involved in this alarm event for reporting purposes.

The above process continues for other IEDs that may have received the initial broadcast from C2 until expiration of the event window at 320. At that point, unless B1 has been supplanted as the owner by some other IED in the interim, B1 compiles an event report at 322. As mentioned, the report may include the timestamp of the alarm event, an aggregation of the identifications of all (or most) IEDs that broadcasted about the alarm event (i.e., B1, C1, C2, C3), and any relevant parametric data or information B1 collected about the alarm event, such as voltage level, current level, power level (real, reactive, and/or apparent), power factor, line frequency, event duration, and the like. At 324, B1 sends the event report to the monitor and control system 108.

In the foregoing, it is expected that IEDs at nodes that are higher in the hierarchy of the electrical power system 100 (FIG. 1) will have higher power levels, and thus will assume ownership of any alarm event shared with IEDs at nodes that are lower in the hierarchy. In such an arrangement, usually only one IED (the same IED) will have ownership of any shared alarm events. It is possible, however, for two or more IEDs at different levels in the system hierarchy to have the same power level, depending on the application (e.g., B2 and C4). In that case, an arbitration procedure based on power level will result in a tie between these IEDs. When such a tie happens, the IED that initiated the broadcast takes ownership over the IED that received the broadcast, in some embodiments. This tiebreaker scheme is depicted in FIG. 4.

Figure 4:
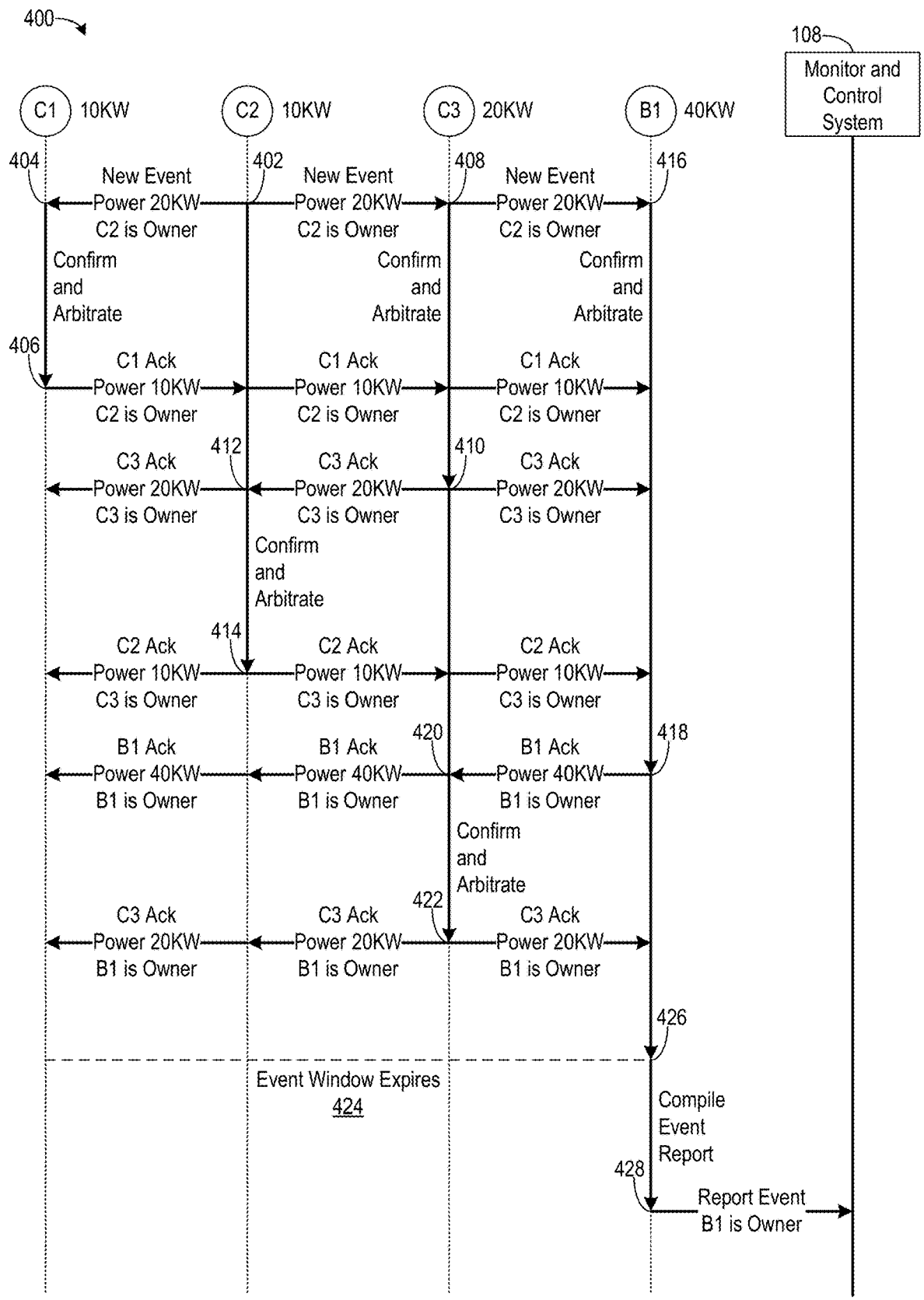
FIG. 4 is a timing diagram illustrating another exemplary alarm arbitration sequence according to embodiments of the present disclosure.

FIG. 4 illustrates an exemplary timing diagram 400 showing a sequence similar to the one described in FIG. 3 for B1, C1, C2, C3. In this example, however, C1 and C2 have the same operating power levels (10 KW), while C3 has a higher operating power level (20 KW) compared to C1 and C2. The sequence 400 begins at 402, where C2 has once again detected an alarm event and sends a communication about the event to other IEDs, including the C2 timestamp for the event. This timestamp again becomes the start time for an event window in C2 (and in other IEDs that received the communication). The communication is again a general broadcast communication to all IEDs. C1 receives the broadcast at 404, confirms the event, and initiates an arbitration. The arbitration results in a tie, so C2 is awarded ownership of the alarm event because it issued the original broadcast. C1 then sends a broadcast at 406 that includes an acknowledgment, the C1 power level, and identifies C2 as the owner of the event. C1 thereafter drops out for purposes of reporting the alarm event. Likewise, C3 receives the broadcast from C2 at 408, confirms the alarm event, and initiates an arbitration. The arbitration determines that C3 is the owner based on its higher power level compared to C2. At 410, C3 sends a broadcast with an acknowledgment, the C3 power level, and identifies itself as the event owner. C2 receives this broadcast at 412, confirms the alarm event, and initiates an arbitration. The arbitration determines that C3 is the owner, so at 414, C2 broadcasts an acknowledgment, the C2 power level, and identifies C3 as the owner. C2 thereafter drops out for reporting purposes.

B1 also receives the broadcast from C2 at 416, confirms the alarm event, and initiates an arbitration. The arbitration determines that B1 is the owner of the alarm event by virtue of its higher power level (40 KW) compared to C2 (20 KW). B1 then sends a broadcast at 418 with an acknowledgment, the B1 power level, and identifies itself as the event owner. C3 receives this broadcast at 420, confirms the alarm event, and initiates an arbitration. The arbitration determines that B1 is the owner, so at 422, C3 broadcasts an acknowledgment, the C3 power level, and identifies B1 as the owner. C3 thereafter drops out for reporting purposes. The above process continues for other IEDs that may have received the broadcast from C2 until expiration of the event window at 424. At 426, if B1 is still the owner, it compiles an event report that may include the timestamp of the alarm event, an aggregation of the identifications of all (or most) IEDs that broadcasted about the alarm event, and any relevant information B1 collected about the alarm event. At 428, B1 sends the event report to the monitor and control system 108.

In the above example, a tie goes to the IED that initiated the alarm event broadcast. In some embodiments, however, it is possible to have a tie go against the IED that initiated the alarm event broadcast instead. In further embodiments, when a tie happens, each IED involved in the tie can take ownership of the alarm event and report the alarm event to the monitor and control system 108 as if that IED was the owner of the alarm event.

Thus far, embodiments have been described in which multiple IEDs have alarm arbitration capability and each such IED can arbitrate its own ownership of an alarm event. In some embodiments, instead of each IED arbitrating its own alarm event ownership, one IED from among a group or quorum of IEDs may be designated to arbitrate ownership of the alarm event for the quorum. In these embodiments, the quorum is preferably composed of an IED at a given node and the IEDs at nodes one hierarchy level downstream from the given node that are fed by the given node. Thus, referring to FIG. 1, for example, A1, B1, B2, B3 form a quorum, while B1, C1, C2, C3 form another quorum, and so on. An example of an IED equipped with quorum alarm arbitration capability is depicted in FIG. 5.

Figure 5:
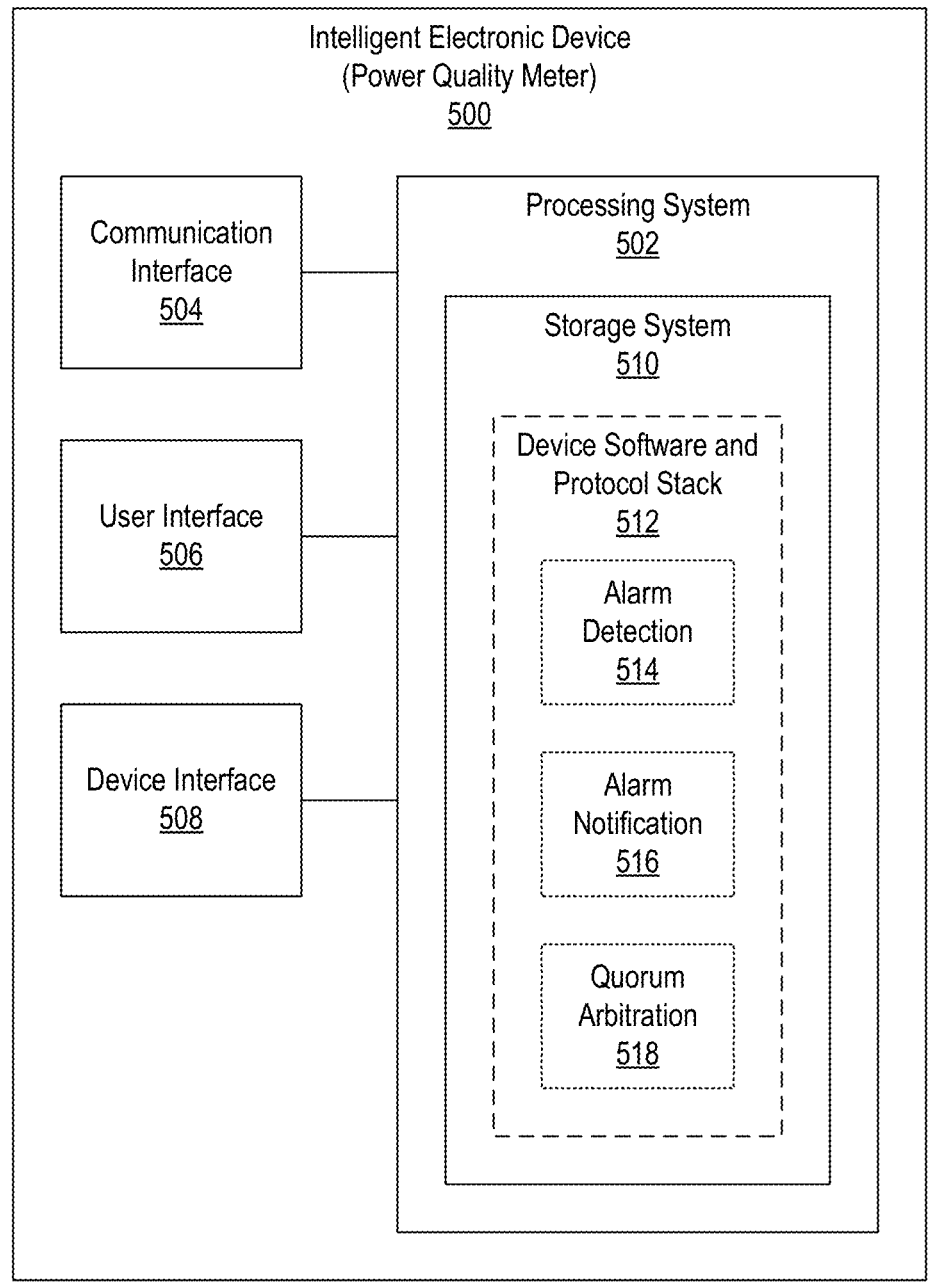
FIG. 5 is a block diagram illustrating an alternative intelligent electronic device according to embodiments of the present disclosure.

Turning now to FIG. 5, a simplified view of an exemplary IED 500 having quorum alarm arbitration capability is shown. The IED 500 is similar to the IED 200 from FIG. 2 insofar as it includes a processing system 502, communication interface 504, user interface 506, and device interface 508, all connected to the processing system 502. These components are similar in construction and operation to their counterparts in FIG. 2. That is, the communication interface 504 permits the EID 500 to communicate with other systems or devices, the user interface 504 enables user configuration and control of the IED 500, and the device interface 508 allows the IED 500 to connect and receive power metering signals, including voltage signals, current signals, power signals, and other energy-related signals, at a node in the electrical power system.

The processing system 502 includes a storage system 510 that is also similar in construction and operation to its counterpart in FIG. 2. Thus, the storage system 510 can store software 512, such as device software and protocol stack, that the IED 500 can use to carry out its intended operations. The software 510 can also include computer programs, firmware, or other forms of machine-readable instructions, including an operating system, utilities, drivers, network interfaces, applications, and other types of software. Although not expressly shown, the processing system 502 can also include at least one microprocessor and other circuitry to retrieve and execute the software 512 from storage system 510.

The software 512 also has an alarm detection module 514 and an alarm notification module 516 that operate in a similar manner to their counterparts in FIG. 2. However, instead of a device-device arbitration module, the software 512 has a quorum arbitration module 518 stored thereon, among other programming. When an alarm event occurs, the alarm detection module 514 records certain information about the event, including the timestamp, event type, event duration, and other information that may be relevant to a user for resolving the alarm. This information is then packaged by the alarm notification module 516 together with the identification of the IED 500 and the power level of the IED for communication to other IEDs. Other IEDs similar to the IED 500 that also detected the alarm event can likewise communicate the information they recorded about the alarm event.

For each such communication that the IED 500 receives from the other IEDs, the quorum arbitration module 518 stores the information contained in the communication and confirms that the communication relates to an alarm event recently detected by the IED 500. When the event window for the detected alarm event expires, the quorum arbitration module 518 conducts an arbitration procedure to determine which IED should be the owner of the alarm event from amongst the various IEDs that communicated about the alarm event. In some embodiments, the quorum arbitration module 518 conducts the arbitration procedure based on the operating power levels of the IEDs, such that the IED with the highest operating power level is designated as the owner of the alarm event for alarm reporting purposes. The quorum arbitration module 518 then packages (i.e., formats) the result of the arbitration, including the identification of the arbitrated owner, together with an acknowledgment, the identification of the IED 500, and the power level of the IED 500, for transmission. The quorum arbitration module 518 thereafter forwards this package of information to the communication interface 504 to be communicated to other IEDs in the manner described above. At this point, if the IED 500 itself was arbitrated as the owner, then it compiles and sends a report about the alarm event to a monitor and control system in the manner described above.

The above process proceeds for each IED that received a communication about an alarm event within a predefined window for the event. If an IED has ownership of the alarm event after the event window closes, then it reports the event to the monitor and control system 108. If an IED is replaced by another IED as owner of the alarm event during the event window, then the IED takes no further reporting action and drops out of the reporting process, and whichever IED has ownership when the event window closes will send the report. As mentioned, the report may include the timestamp of the alarm event, the identifications of all (or most) IEDs that detected the alarm event (as contained in their broadcasts), and any parametric data and information the owner IED collected about the alarm event, such as voltage level, current level, power level (real, reactive, and/or apparent), power factor, line frequency, event duration, and the like.

Figure 6:
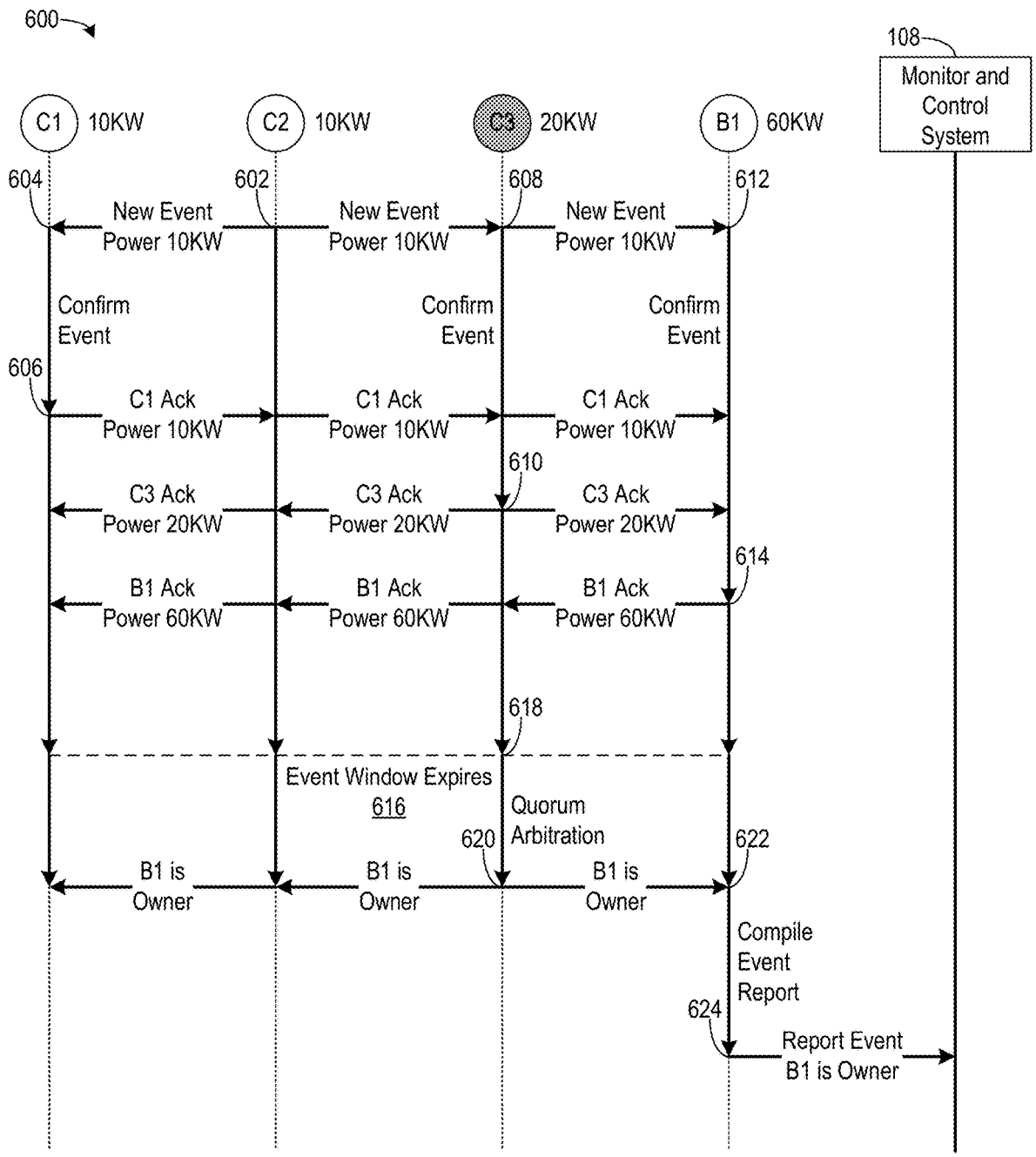
FIG. 6 is a timing diagram illustrating an alternative alarm arbitration sequence according to embodiments of the present disclosure.

FIG. 6 illustrates an exemplary timing diagram 600 showing a sequence in which quorum alarm arbitration is performed according to the disclosed embodiments. In this example, the quorum is composed of B1, C1, C2, C3 from FIG. 1, with C3 designated (e.g., via user configuration) as the alarm arbitrator for the quorum. Once again, C2 has detected an alarm event and sends a communication about the event to other IEDs at 602 including the C2 timestamp for the event. This timestamp again becomes the start time for an event window in C2 (and in other IEDs that received the communication). The communication may again be a general broadcast communication to all IEDs. C1 receives the broadcast at 604, confirms that it detected the same alarm event (e.g., via comparison of timestamps), and broadcasts an acknowledgment at 606 that includes the C1 power level. C3 also receives the broadcast from C2 at 608, confirms the alarm event, and broadcasts an acknowledgment at 610 that includes the C3 power level. B1 likewise receives the broadcast from C2 at 612, confirms the alarm event, and broadcasts an acknowledgment at 614 that includes the B1 power level.

The above process proceeds for other IEDs that may have received the initial broadcast from C2 until expiration of the event window at 616. At 618, the designated alarm arbitrator, C3, initiates a quorum arbitration procedure based on the power levels received from the IEDs that broadcasted about the alarm event. The quorum arbitration determines that B1 has the highest power level from amongst the quorum (i.e., B1, C1, C2, C3), and designates B1 as the owner of the alarm event for reporting purposes. At 620, C3 sends a broadcast to the other IEDs identifying B1 as the owner of the alarm event. B1 receives the broadcast at 622, and begins compiling an event report that includes the timestamp of the alarm event, an aggregation of the identifications of all (or most) IEDs that broadcasted about the alarm event, and any relevant information B1 collected about the alarm event. At 624, B1 sends the event report to the monitor and control system 108.

Figure 7:
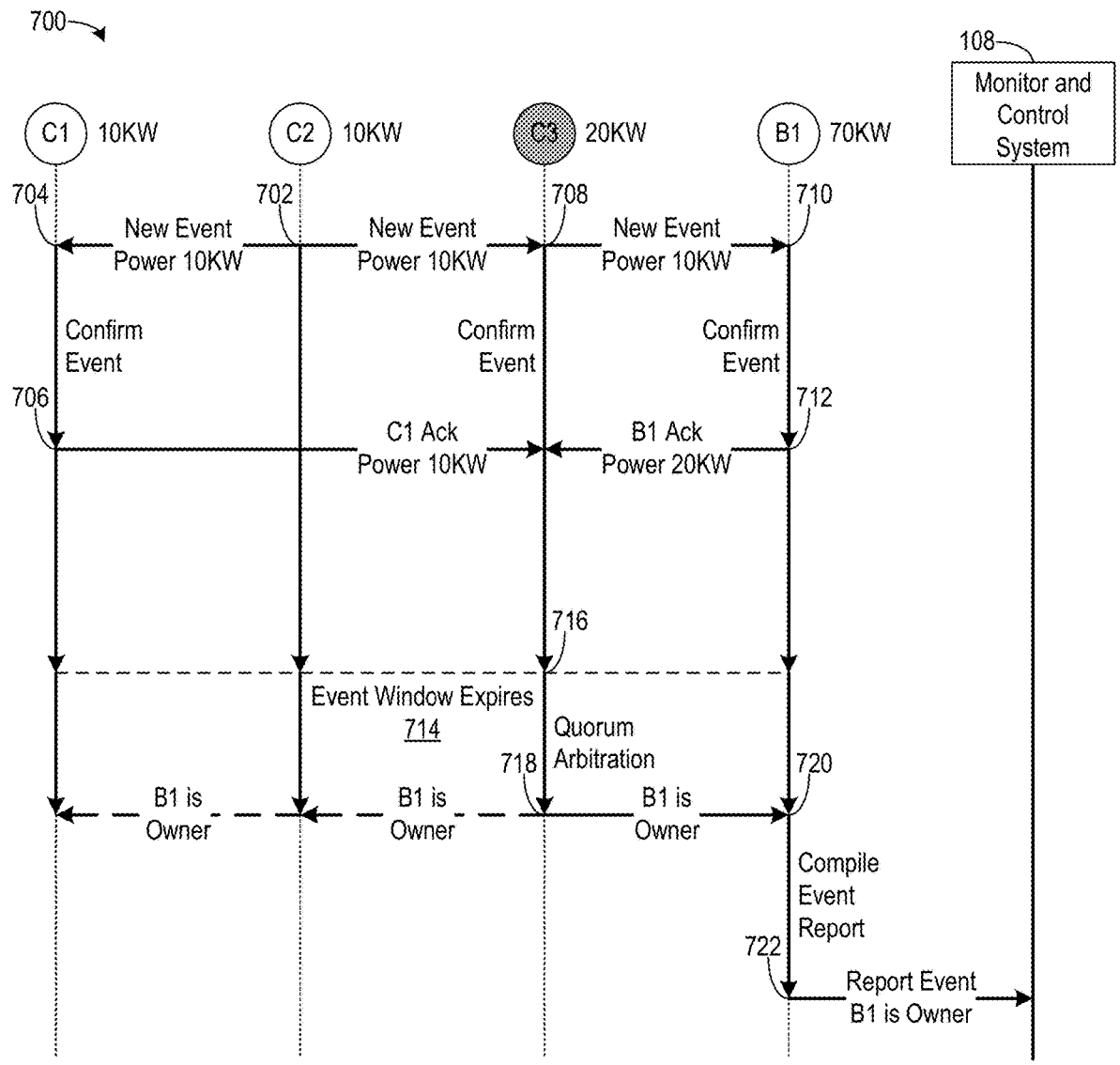
FIG. 7 is a timing diagram illustrating another alternative alarm arbitration sequence according to embodiments of the present disclosure.

FIG. 7 illustrates an exemplary timing diagram for a method 700 similar to the one in FIG. 6, except communications about the alarm event are sent specifically to the designated arbitrator instead of as a broadcast communication to all IEDs. In this example, the quorum is again composed of B1, C1, C2, C3 from FIG. 1, with C3 again designated (e.g., via user configuration) as the alarm arbitrator for the quorum. Once again, C2 has detected an alarm event and sends a communication about the event to other IEDs at 702 including the C2 timestamp for the event. This timestamp again becomes the start time for an event window in C2 (and in other IEDs that received the communication). The communication may again be a general broadcast education to all IEDs. C1 again receives the broadcast at 704, and again confirms that it detected the same alarm event (e.g., via comparison of timestamps). However, instead of broadcasting its acknowledgment to all IEDs, C1 transmits the acknowledgment specifically to C3, at 706. C3 also receives the broadcast from C2 at 708 and confirms the alarm event, but does not transmit an acknowledgment, as C3 is the designated arbitrator. B1 likewise receives the broadcast from C2 at 710, confirms the alarm event, and transmits an acknowledgment directly to C3 at 714 that includes the B1 power level.

The above process proceeds for other IEDs that may have received the initial broadcast from C2 until expiration of the event window at 714. At 716, C3 initiates a quorum arbitration procedure and again designates B1 as the owner of the alarm event for reporting purposes. At 718, C3 sends a communication to B1 to confirm that B1 is the owner of the alarm event. As an alternative, instead of sending a communication only to B1 (or whichever IED is the arbitrated owner), in some embodiments, C3 may optionally send a broadcast to all IEDs (indicated by the dashed arrows to C1 and C2) acknowledging B1 as the owner of the alarm event. In either case, upon receiving the confirmation at 720, B1 begins to compile an event report as described above. At 722, B1 sends the event report to the monitor and control system 108.

In the foregoing, specific embodiments of the present disclosure were shown and described with respect to several timing diagrams. Following now are several flow diagrams illustrating general methods that may be used with embodiments of the present disclosure.

Figure 8:
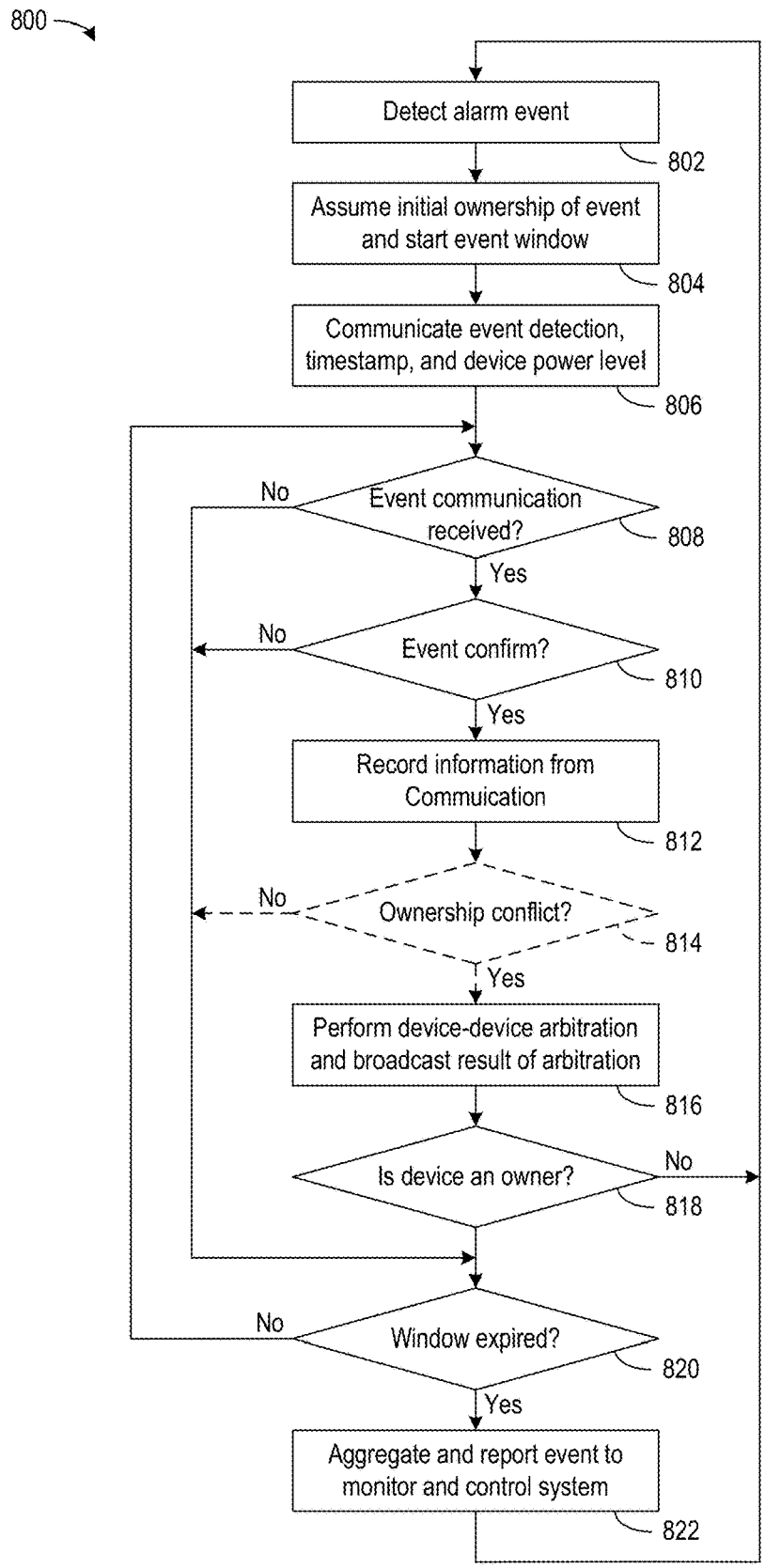
FIG. 8 is a flow diagram illustrating an exemplary method that may be used for device level alarm arbitration according to embodiments of the present disclosure.

Referring to FIG. 8, a flow diagram illustrating an exemplary method 800 is shown that may be used for individual IED alarm arbitration (FIGS. 2-4) according to embodiments of the present disclosure. The method 800 generally begins at 802 where a given IED detects an alarm event. At 804, the IED assumes initial ownership of the alarm event by default and starts an event window. As mentioned earlier, the event window may be from 1-2 seconds in some embodiments. At 806, the IED initiates a broadcast about the detected alarm event and identifies itself as the owner of the event for reporting purposes. The alarm event broadcast may include, among other things, the timestamp of the event and the power level of the IED.

At 808, the given IED determines whether it has received an alarm event broadcast from another IED. This alarm event broadcast may be an acknowledgment of the initial broadcast from the given IED, or it may be an unrelated broadcast about a different alarm event from the other IED. In either case, if the determination is yes, meaning a broadcast was received, then at 810, the given IED determines whether the event timestamp in the received broadcast matches the event timestamp for the recently detected alarm event (within a certain percent tolerance). If the determination is again yes, indicating occurrence of a shared event or at least events that overlap, then at 812, the given IED records the information in the received broadcast, including the event timestamp, the power level of the other IED, and the identification of the alarm event owner.

As an optional step (shown in dashed lines), at 814, the given IED determines whether its ownership of the alarm event conflicts with the alarm event ownership identified in the received broadcast. If the determination is again yes, meaning there is a conflict, then the given IED performs a device-device arbitration procedure at 816 and sends a broadcast containing the arbitration results (i.e., event timestamp, power level of IED, and arbitrated owner). Alternatively, the IED may proceed directly from recording the information in the communication at 812 to performing the device-device arbitration procedure at 816 in some embodiments. In some embodiments, the device-device arbitration procedure is based on IED power level, such that whichever IED has a higher power level is arbitrated the owner.

At 818, the given IED determines whether it is still the owner. If the determination is no, meaning it is no longer the owner, then the given IED drops out of the reporting process for this alarm event and returns to 802 to detect another alarm event. If the determination is yes, meaning the given IED is the arbitrated owner, then the IED proceeds to 820 to determine whether the event window has expired. If the determination is yes, meaning the event window has expired, then at 822, the given IED aggregates the identifications of the IEDs recorded at 812, prepares a report about the alarm event, and transmits the report to a monitor and control system for further action as needed.

If the determination at 820 is no, meaning the event window has not expired, then the IED returns to 808 to check for additional broadcasts from additional IEDs, and the repeats method as described above. Similarly, if the determination at 808, 810, or 814 is no, then the IED jumps to 820 and repeats the method as described above. Note that in some cases, due to device latency and differences in processing speeds, an IED may receive a communication about an alarm event (at 808) before it has detected occurrence of the alarm event (at 802). In that case, a time-limited flag or other indicator may be set in the IED upon receipt of the communication to indicate that the IED has already received the communication. When the IED subsequently detects the alarm event at 802 and later reaches the determination at 808, the flag or other indicator instructs the IED to bypass the determination at 808 and proceed directly to 810.

Figure 9:
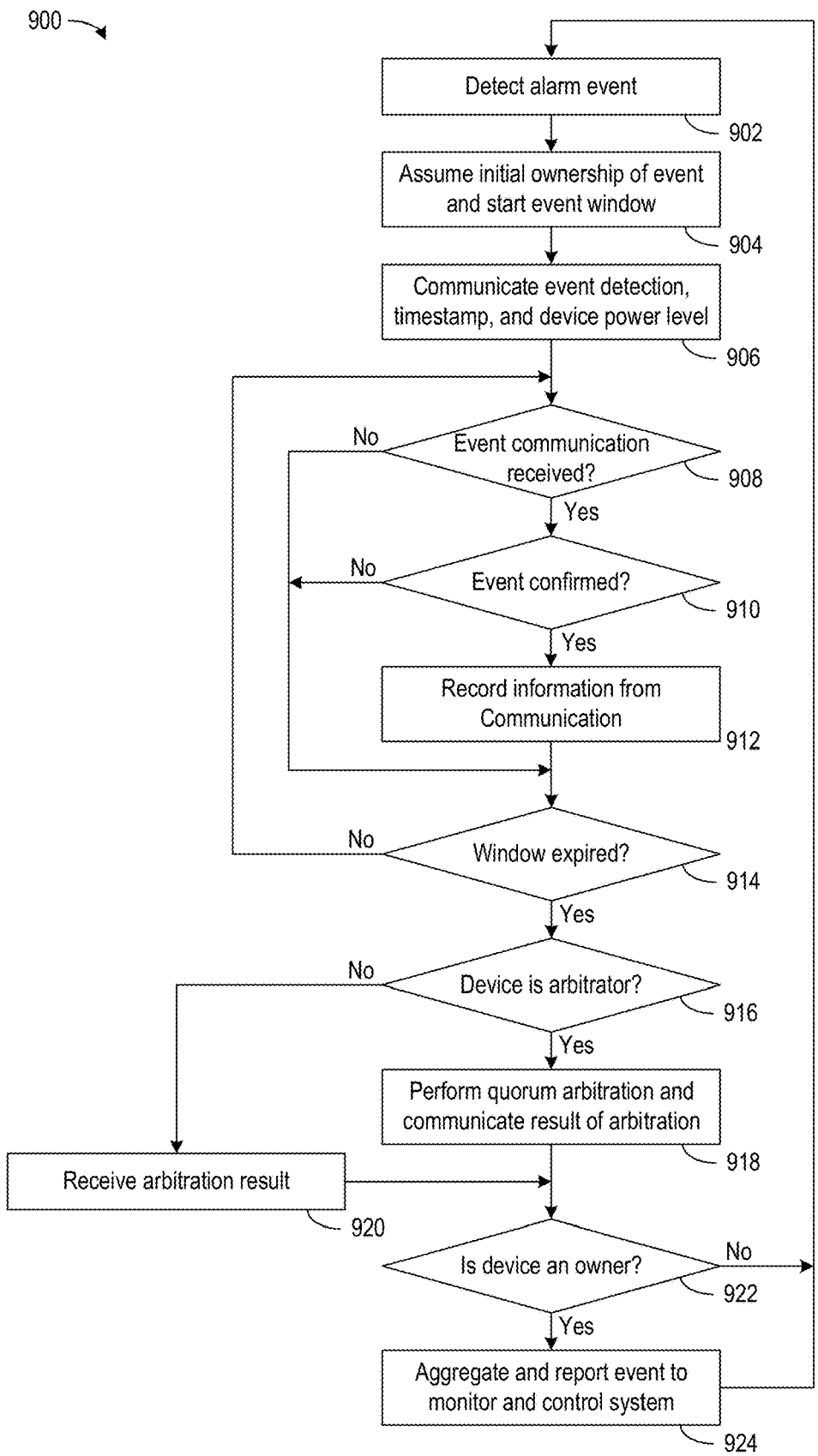
FIG. 9 is a flow diagram illustrating an exemplary method that may be used for quorum level alarm arbitration according to embodiments of the present disclosure.

FIG. 9 is a flow diagram illustrating another exemplary method 900 similar in certain aspects to the one in FIG. 8, except the method here may be used for quorum IED alarm arbitration (FIGS. 5-7). The method 900 again generally begins at 902 where a given IED detects an alarm event. The IED in this case is a member of an IED quorum, as that term was defined above. At 904, the IED assumes initial ownership of the alarm event by default and starts an event window (e.g., 1-2 seconds). At 906, the given IED communicates the detected alarm event to at least one other IED, identifying itself as the event owner, and including the event timestamp and IED power level. In some embodiments, the communication may be a broadcast to multiple IEDs. In some embodiments, the communication may include parametric data and information that the given IED collected about the alarm event.

At 908, the given IED again determines whether it has received an alarm event broadcast from another IED. If the determination is yes, then at 910, the given IED determines whether the event timestamp in the received broadcast matches the event timestamp for the recently detected alarm event (within a certain percent tolerance). If the determination is again yes, then at 912, the given IED records the information in the received broadcast, including the event timestamp, the power level of the other IED, and the identification of the alarm event owner.

At 914, the IED determines whether the event window has expired. If the determination is yes, then the IED determines whether it has been designated (e.g., via user configuration) the arbitrator for the quorum at 916. If the determination is again yes, then the IED performs a quorum arbitration procedure at 918 and sends a broadcast containing the arbitration results (i.e., event timestamp, power level of IED, and arbitrated owner). In some embodiments, the quorum arbitration procedure is also based on IED power level, such that whichever IED has the highest power level is arbitrated the owner.

If the determination at 916 is no, meaning the IED was not designated as the quorum arbitrator, then at 920, the IED waits a predefined amount of time to receive the results of the quorum arbitration performed by whichever IED in the quorum was the designated quorum arbitrator. The IED thereafter proceeds to 922 and determines whether it was arbitrated the owner of the alarm event. If the determination is no, meaning it is not the owner, then the IED drops out of the reporting process for this alarm event and returns to 902 to detect another alarm event. If the determination is yes, then at 924, the given IED aggregates the identifications of the IEDs recorded at 912, prepares a report about the alarm event, and transmits the report to a monitor and control system for further action as needed.

If the determination at 914 is no, meaning the event window has not expired, then the IED returns to 908 to check for additional broadcasts from additional IEDs, and the repeats method as described above. Similarly, if the determination at 908 or 910 is no, then the IED jumps to 914 and repeats the method as described above.

Figure 10:
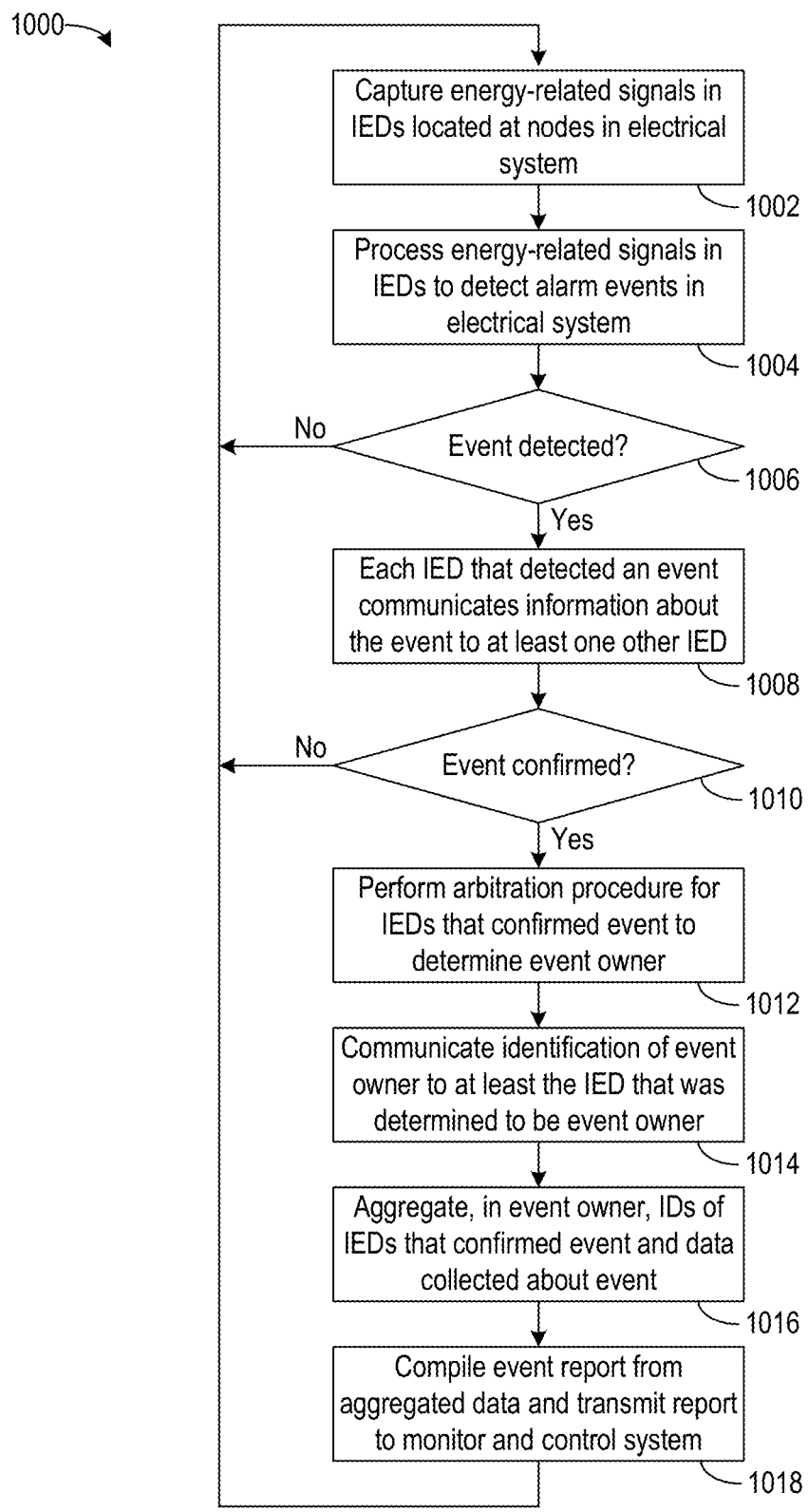
FIG. 10 is a flow diagram illustrating an exemplary method of using system alarm arbitration to aggregate alarms according to embodiments of the disclosure.

FIG. 10 is a flow diagram illustrating an exemplary method 1000 of using alarm arbitration in an electrical system (see FIG. 1) to aggregate alarm events according to embodiments of the present disclosure. The method generally begins at 1002 where a plurality IEDs installed at various locations or nodes in the electrical system capture energy-related signals at their respective locations. As mentioned, the electrical system may be an electrical power system in some embodiments, and the energy-related signals may be voltage signals, current signals, power signals, and the like.

At 1004, the various IEDs process the energy-related signals to determine if an alarm event has occurred in the electrical system, such as a voltage/current transient, interruption, sag or undervoltage, swell or overvoltage, or the like. At 1006, a determination is made by each IED that captured an energy-related signal whether an alarm event has occurred at the respective location of the IED. At 1008, each IED that detected occurrence of an alarm event communicates information about that alarm event to at least one other IED. The communication may be in the form of a broadcast to multiple IEDs in some embodiments, and the information may include the event timestamp, the power level of the sending IED, and the identification of the IED in some embodiments. In some embodiments, the communication may also include any data or information that the ID collected about the event.

At 1010, the IEDs that received the communication about the alarm event determine whether the event matches an event that they recently detected. This may be done by comparing the event timestamp received in the communication with the timestamp of any recently detected events to see if there's a match (within a certain percentage). If there is a match, then the received event is confirmed as either the same as the detected event, or the events overlap.

At 1012, an arbitration procedure is performed for the IEDs that confirmed the alarm event to determine which IED should be the owner of the event for reporting purposes. The arbitration may be performed on an individual device basis where each IED conducts its own arbitration procedure, or the arbitration may be performed on a group or quorum basis where one IED is the designated as the arbitrator for the quorum. At 1014, the identification of the event owner is communicated to at least the IED that was arbitrated as the event owner to inform that IED of its ownership of the event. In some embodiments, the identification of the event owner may be communicated to all IEDs involved in the arbitration procedure.

At 1016, the IED that was arbitrated as the event owner aggregates the data and information it received about the alarm event, such as the identifications of the IEDs that confirmed the alarm event. In some embodiments, this information may also include any parametric data those IEDs collected about the alarm event. At 1018, the arbitrated event owner IED compiles a report about the event from the aggregated data and information and transmits the report to a monitoring control system. The monitor and control system may thereafter take any action that may be needed to resolve the alarm event in the report.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. An intelligent electronic device (IED), comprising:
a processing system; and
a storage system coupled to the processing system, the storage system storing instructions thereon that, when executed by the processing system, cause the IED to:
capture first energy-related signals at the IED;
detect occurrence of an alarm event at the IED based on the first energy-related signals captured at the IED;
receive a communication from other IED containing information about an alarm event detected by the other IED based on second energy-related signals captured at the other IED;
confirm whether the alarm event detected by the IED and the alarm event detected by the other IED relate to a shared alarm event or overlapping alarm events;
perform an arbitration procedure in response to confirmation that the alarm event detected by the IED and the alarm event detected by the other IED relate to the shared alarm event or the overlapping alarm events, the arbitration procedure determining which IED owns the shared alarm event or the overlapping alarm event;
aggregate information about the shared alarm event or the overlapping alarm events in response to a determination that the IED owns the shared alarm event or the overlapping alarm events, the aggregated information including identification information for at least the IED and the other IED; and
send a report containing the aggregated information about the shared alarm event or the overlapping alarm events to a monitor and control system.

2. The IED of claim 1, wherein the instructions cause the IED to compare a timestamp of the alarm event detected by the IED to a timestamp of the alarm event detected by the other IED to confirm whether the alarm event detected by the IED and the alarm event detected by the other IED relate to the shared alarm event or the overlapping alarm events.

3. The IED of claim 1, wherein the instructions cause the IED to send a broadcast communication in response to said detecting the occurrence of the alarm event at the IED, the broadcast communication containing information about the alarm event detected by the IED.

4. The IED of claim 1, wherein the instructions cause the IED to perform the arbitration procedure based on IED operating power levels.

5. The IED of claim 4, wherein the arbitration procedure performed by the IED is one of a device-device arbitration procedure and a quorum arbitration procedure, the device-device arbitration procedure arbitrating between two IEDs of a plurality of IEDs, and the quorum arbitration procedure arbitrating amongst two or more IEDs of the plurality of IEDs.

6. The IED of claim 1, wherein the instructions cause the IED to send an acknowledgment communication in response to confirming that the alarm event detected by the IED and the alarm event detected by the other IED relate to the shared alarm event or the overlapping alarm events, the acknowledgment communication being sent as one of a broadcast communication to a plurality of IEDs and a specific communication to a first IED of the plurality of IEDs designated as an arbitrator.

7. The IED of claim 1, wherein the instructions cause the IED to send a communication confirming that the other IED owns the shared alarm event or the overlapping alarm events in response to a determination that the other IED owns the shared alarm event or the overlapping alarm events, the confirming communication being sent as one of a broadcast communication to a plurality of IEDs and a specific communication to the other IED.

8. A method of managing alarms in an electrical power system, comprising:
capturing first energy-related signals at a first intelligent electronic device (IED) in the electrical power system; and
capturing second energy-related signals at a second IED in the electrical power system, the first IED and the second IED located at different nodes in the electrical power system;
detecting occurrence of an alarm event at the first IED based on the first energy-related signals captured at the first IED;
receiving, at the first IED, a communication from the second IED, the communication containing information about an alarm event detected by the second IED based on the second energy-related signals captured at the second IED;
confirming, at the first IED, whether the alarm event detected by the first IED and the alarm event detected by the second IED relate to a shared alarm event or overlapping alarm events;
performing, at the first IED, an arbitration procedure in response to confirmation that the alarm event detected by the first IED and the alarm event detected by the second IED relate to the shared alarm event or the overlapping alarm events, the arbitration procedure determining which IED owns the shared alarm event or the overlapping alarm events;
aggregating, at the first IED, information about the shared alarm event or the overlapping alarm events in response to a determination that the first IED owns the shared alarm event or the overlapping alarm events, the aggregated information including identification information for at least the first IED and the second IED; and
sending, at the first IED, a report containing the aggregated information about the shared alarm event or the overlapping alarm events to a monitor and control system.

9. The method of claim 8, further comprising comparing, at the first IED, a timestamp of the alarm event detected by the first IED to a timestamp of the alarm event detected by the second IED to confirm whether the alarm event detected by the first IED and the alarm event detected by the second IED relate to the shared alarm event or the overlapping alarm events.

10. The method of claim 8, further comprising sending, at the first IED, a broadcast communication in response to said detecting the occurrence of the alarm event at the first IED, the broadcast communication containing information about the alarm event detected by the first IED.

11. The method of claim 8, wherein the first IED performs the arbitration procedure based on IED operating power levels.

12. The method of claim 11, wherein the arbitration procedure performed by the first IED is one of a device-device arbitration procedure and a quorum arbitration procedure, the device-device arbitration procedure arbitrating between two IEDs of a plurality of IEDs, and the quorum arbitration procedure arbitrating amongst two or more IEDs of the plurality of IEDs.

13. The method of claim 8, further comprising sending, at the first IED, an acknowledgment communication in response to confirming that the alarm event detected by the first IED and the alarm event detected by the second IED relate to the shared alarm event or the overlapping alarm events, the acknowledgment communication being sent as one of a broadcast communication to a plurality of IEDs and a specific communication to an IED of the plurality of IEDs designated as an arbitrator.

14. The method of claim 8, further comprising sending, at the first IED, a communication confirming that the second IED owns the shared alarm event or the overlapping alarm events in response to a determination that the second IED owns the shared alarm event or the overlapping alarm events, the confirming communication being sent as one of a broadcast communication to a plurality of IEDs and a specific communication to the second IED.

15. A system for managing alarms in an electrical power system, comprising:
a plurality of intelligent electronic devices (IEDs) in the electrical power system, each IED of the plurality of IEDs located at a different node in the electrical power system, each IED storing programming therein that causes to:
capture first energy-related signals at an IED of the plurality of IEDs;
detect occurrence of an alarm event at the IED based on the first energy-related signals captured at the IED;
receive a communication from at least one other IED containing information about an alarm event detected by the at least one other IED based on second energy-related signals captured at the at least one other IED;
confirm whether the alarm event detected by the IED and the alarm event detected by the at least one other IED relate to a shared alarm event or overlapping alarm events;
perform an arbitration procedure in response to confirmation that the alarm event detected by the IED and the alarm event detected by the at least one other IED relate to the shared alarm event or the overlapping alarm events, the arbitration procedure determining which IED owns the shared alarm event or the overlapping alarm events;
aggregate information about the shared alarm event or the overlapping alarm events in response to a determination that the IED owns the shared alarm event or the overlapping alarm events, the aggregated information including identification information for at least the IED and the at least one other IED; and
send a report containing the aggregated information about the shared alarm event or the overlapping alarm events to a monitor and control system.

16. The system of claim 15, wherein the programming causes the IED to compare a timestamp of the alarm event detected by the IED to a timestamp of the alarm event detected by the at least one other IED to confirm whether the alarm event detected by the IED and the alarm event detected by the at least one other IED relate to the shared alarm event or the overlapping alarm events.

17. The system of claim 15, wherein the programming causes the IED to send a broadcast communication in response to said detecting the occurrence of the alarm event at the IED, the broadcast communication containing information about the alarm event detected by the IED.

18. The system of claim 15, wherein the arbitration procedure performed by the IED is one of a device-device arbitration procedure and a quorum arbitration procedure, the device-device arbitration procedure arbitrating between two IEDs of the plurality of IEDs based on operating power levels thereof, and the quorum arbitration procedure arbitrating amongst two or more IEDs of the plurality of IEDs based on said operating the power levels thereof.

19. The system of claim 15, wherein the programming causes the IED to send an acknowledgment communication in response to confirming that the alarm event detected by the IED and the alarm event detected by the at least one other IED relate to the shared alarm event or the overlapping alarm events, the acknowledgment communication being sent as one of a broadcast communication to the plurality of IEDs and a specific communication to a first IED of the plurality of IEDs designated as an arbitrator.

20. The system of claim 15, wherein the programming causes the IED to send a communication confirming that the at least one other IED owns the shared alarm event or the overlapping alarm events in response to a determination that the at least one other IED owns the shared alarm event or the overlapping alarm events, the confirming communication being sent as one of a broadcast communication to the plurality of IEDs and a specific communication to the at least one other IED.

* * * * *